(12) United States Patent
Revanuru

(10) Patent No.: US 7,904,551 B2
(45) Date of Patent: Mar. 8, 2011

(54) UNICAST CLUSTERING MESSAGING

(75) Inventor: Naresh Revanuru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 12/056,708

(22) Filed: Mar. 27, 2008

(65) Prior Publication Data

US 2008/0270531 A1    Oct. 30, 2008

Related U.S. Application Data

(60) Provisional application No. 60/908,865, filed on Mar. 29, 2007.

(51) Int. Cl.
*G06F 15/173* (2006.01)
*G06F 11/00* (2006.01)

(52) U.S. Cl. .............................. 709/224; 709/238; 714/4

(58) Field of Classification Search .......... 709/201–207, 709/216–234, 238–245
See application file for complete search history.

(56) References Cited

U.S. PATENT DOCUMENTS

| | | | |
|---|---|---|---|
| 2004/0153558 A1* | 8/2004 | Gunduc et al. | 709/229 |
| 2007/0006015 A1* | 1/2007 | Rao et al. | 714/4 |
| 2007/0294577 A1* | 12/2007 | Fiske | 714/13 |

* cited by examiner

*Primary Examiner* — Yasin Barqadle
(74) *Attorney, Agent, or Firm* — Fliesler Meyer LLP

(57) ABSTRACT

A system for clustering messaging in application server specific environment can comprise group leader application server nodes that are inter-connected to each other directly and with group member application server nodes. A group can include at least one group leader application server node and at least one group member server nodes. The group member application server nodes can send and receive messages through associated group leader application server nodes.

15 Claims, 8 Drawing Sheets

UNICAST CLUSTERING MESSAGING

CLAIM OF PRIORITY

This application claims priority from the following application, which is hereby incorporated by reference in its entirety:

U.S. Provisional Application No. 60/908,865, entitled UNICAST CLUSTERING MESSAGING, by Naresh Revanuru, filed on Mar. 29, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of application server network cluster messaging.

BACKGROUND

An application server can be a server computer on a computer network dedicated to running certain software applications (as opposed to e.g. a file server or print server). Generally, an application server can be a software engine that delivers applications to client computers. In some cases, an application server can handle most, if not all, of the business logic and data access of the application. Benefits of application server technology can include the ease of application development and centralization. A J2EE application server refers to an application server that can comply with Java 2 Platform, Enterprise Edition (J2EE) standard.

An application server cluster, such as a WebLogic Server cluster, can consist of multiple application server instances running simultaneously and working together to provide increased scalability and reliability. A cluster can appear to clients to be a single application server instance. The server instances that constitute a cluster can run on the same machine, or be located on different machines. Users can increase a cluster's capacity by adding additional server instances to the cluster on an existing machine, or user can add machines to the cluster to host the incremental server instances.

IP Multicast is a technique for many-to-many communication over an IP infrastructure. It scales to a large receiver population by not requiring prior knowledge of whom or how many receivers there are. Multicast does not require a source sending to a given group to know about the receivers of the group. Multicast requires the source to send a packet only once. Unlike Multicast, Unicast is the sending of information packets to a single destination.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of present invention can be used for cluster communication and liveliness detection within an application server network. Session replication, RMI load balancing and failover, JMS clustering among others are based on this basic building block.

One embodiment of present invention can provide cluster-wide broadcast of cluster messages using multiple unicast messages without the use of multicast sockets. Cluster messages can be sent in scenarios such as:

1. Java Naming and Directory Interface (JNDI) service announcements;
2. cluster heartbeats for liveliness detection—notifications can be sent when a member is added or removed from the cluster;
3. internal subsystem usage;
4. platform usage—e.g. network gatekeeper and Portals.

Embodiments of present invention can use groups of application servers. Each group can have a group leader and multiple group members. Messages from one group can be unicast to group leaders of other groups for transmission to other group members.

Figure 1:
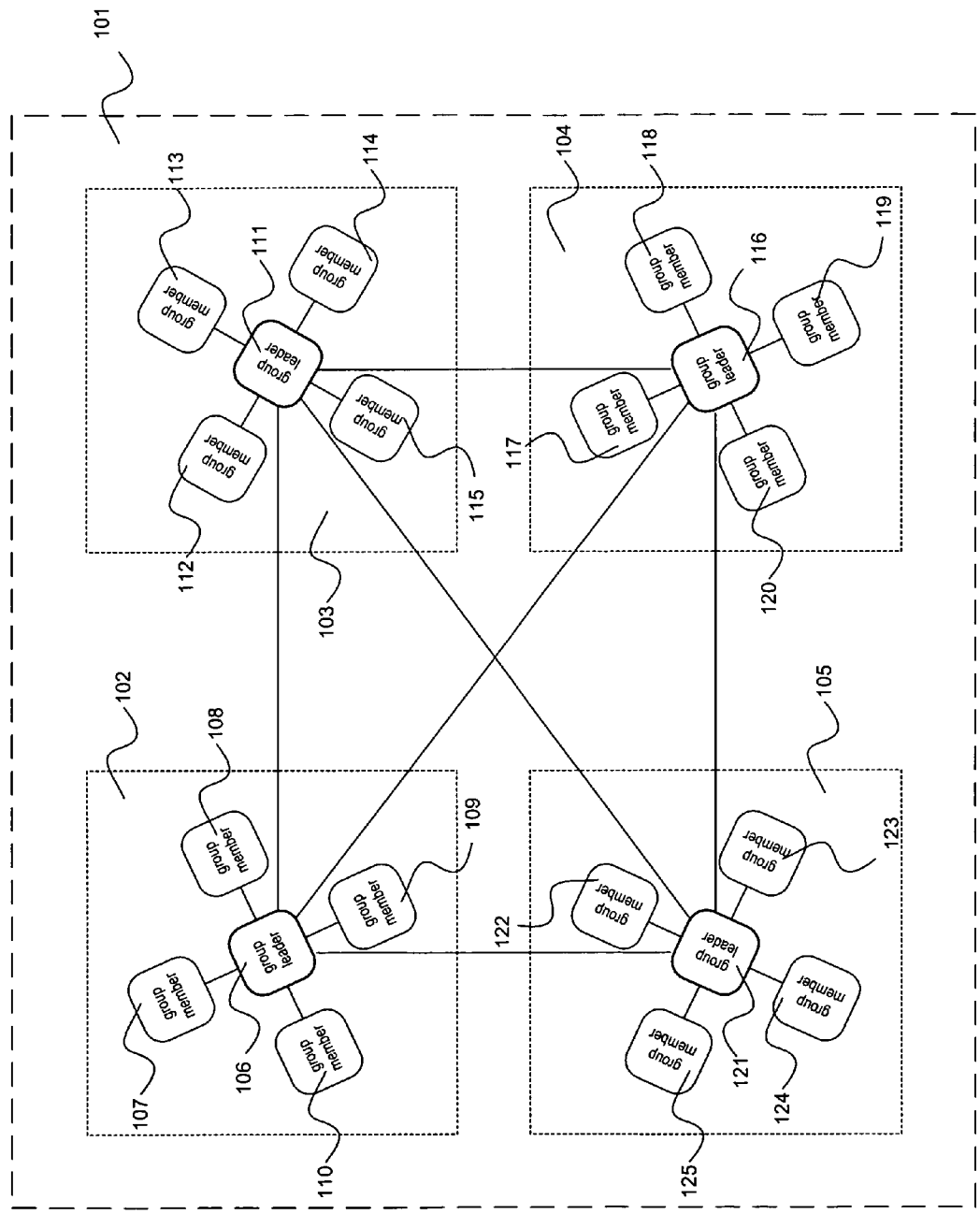
FIG. 1 is an illustration of an exemplary framework of a system for clustering messaging in an application server specific environment in accordance with one embodiment of the present invention.

As shown in FIG. 1, one embodiment of present invention is a system for clustering messaging in application server specific environment 101. Group leader application server nodes 106, 111, 116 and 121 can be inter-connected to each other directly and group member application server nodes 107-110, 112-115, 117-120, and 122-125. A group 102 can include at least one group leader application server node 106 and at least one group member server nodes 107, 108, 109 and 110. The example in FIG. 1 has four groups 102-105 with respective group leader application server nodes 106, 111, 116 or 121. Each one of the group member application server nodes 107-110, 112-115, 117-120, and 122-125 can send and receive messages through associated group leader application server node 106, 111, 116 or 121.

In one embodiment of present invention, such a system allows messages to be spread using unicast socket to all application servers in a cluster 101. FIG. 2 shows an example of the interconnect message paths for the unicast messages sent between the servers.

Another embodiment of present invention allows that an application server nodes group to have more than one group leader application server node.

In one embodiment of present invention, each group member application server node 107-110, 112-115, 117-120, or 122-125 within one of the groups 102, 103, 104, or 105 can monitor the group leader application server node 106, 111, 116 or 121 of the group using heartbeats.

In one example, one group member application server node 107 within the application server node group 102 can replace the group leader application server node 1061 of the group 102 if no heartbeat is detected from the group leader application server node 106.

In one embodiment of present invention, the group leader application server nodes 106, 111, 116 and 121 can retransmit messages to make sure the message eventually reach all participants.

In one embodiment of present invention, each group 102-105 can have a fixed maximum size. For example, in one embodiment of present invention, the fixed size is 20 or less. In one example, the fixed size is 10 group members.

In some embodiments of present invention, one or more group leader application server nodes can be associated either with a super node or multiple layers of super nodes. A super node in application server specific environment or a cluster can be an application server node that connects to multiple group leader application server nodes and directs message transmission among those multiple group leader application server nodes. Super nodes can be interconnected with each other and forming multiple layers for better message transmission within the cluster.

Figure 2A:
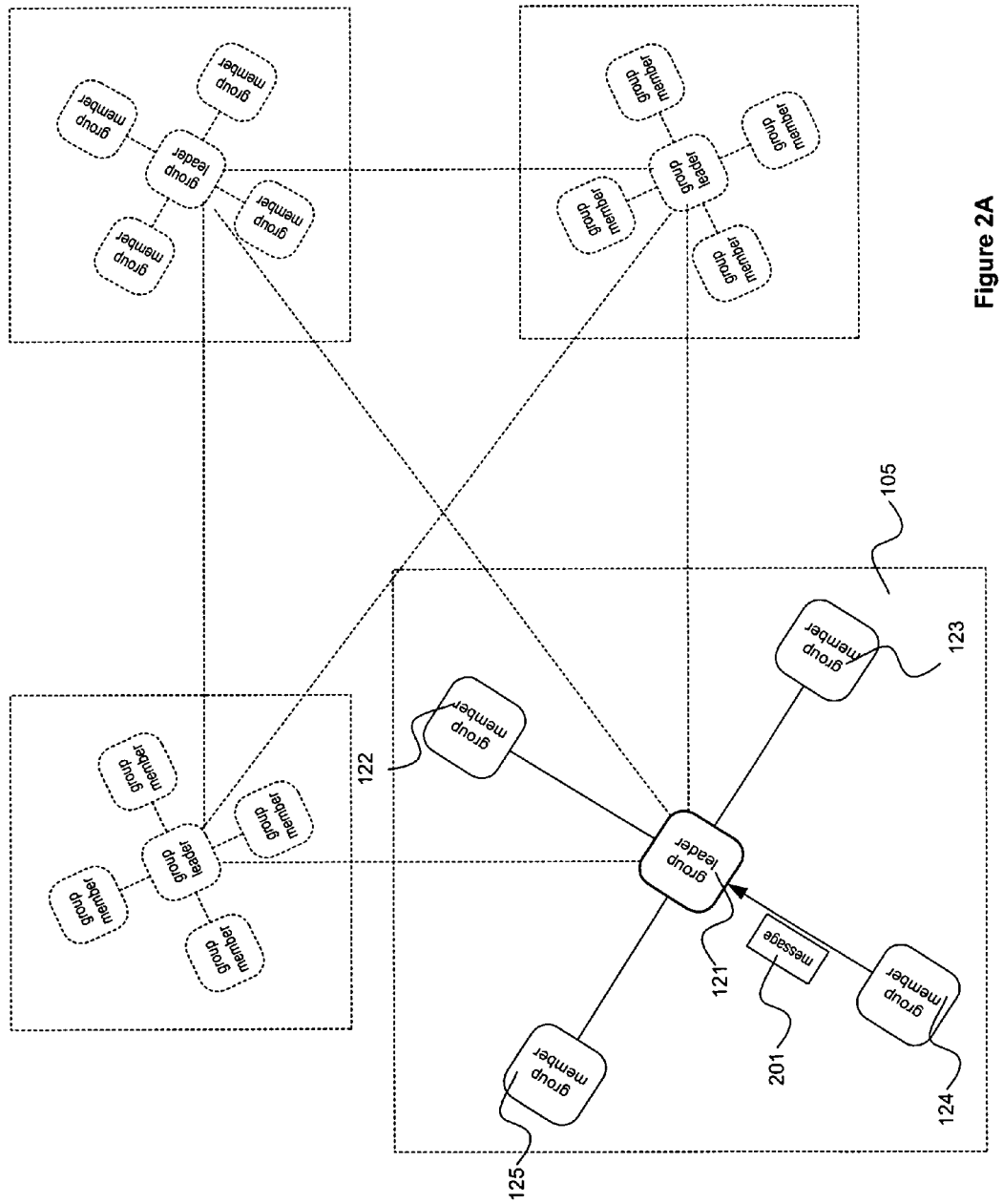
FIG. 2A-2D are exemplary illustrations of the interconnect message paths for the unicast messages sent between the servers in an application server specific environment in accordance with one embodiment of the invention.
Figure 2B:
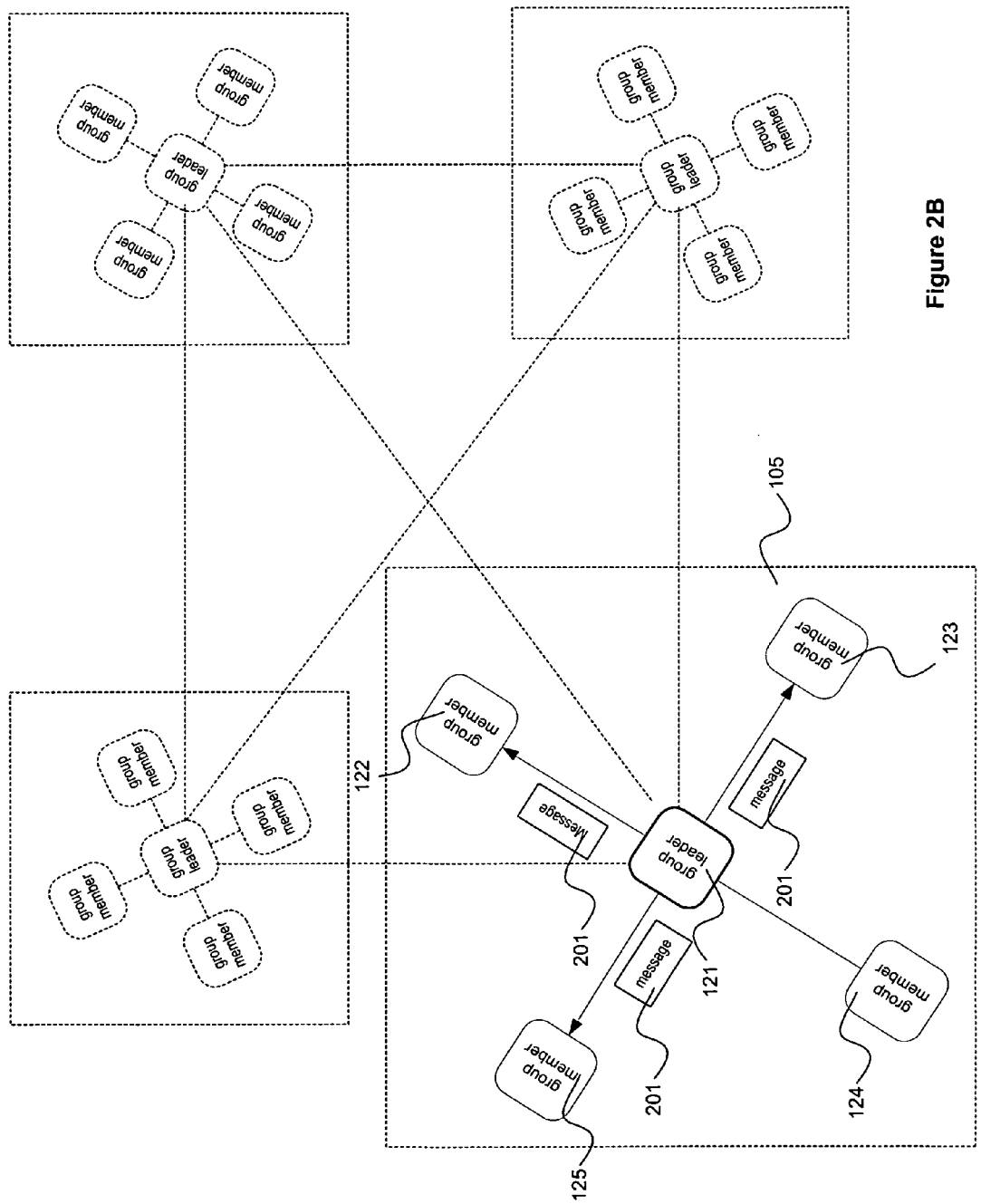
Figure 2C:
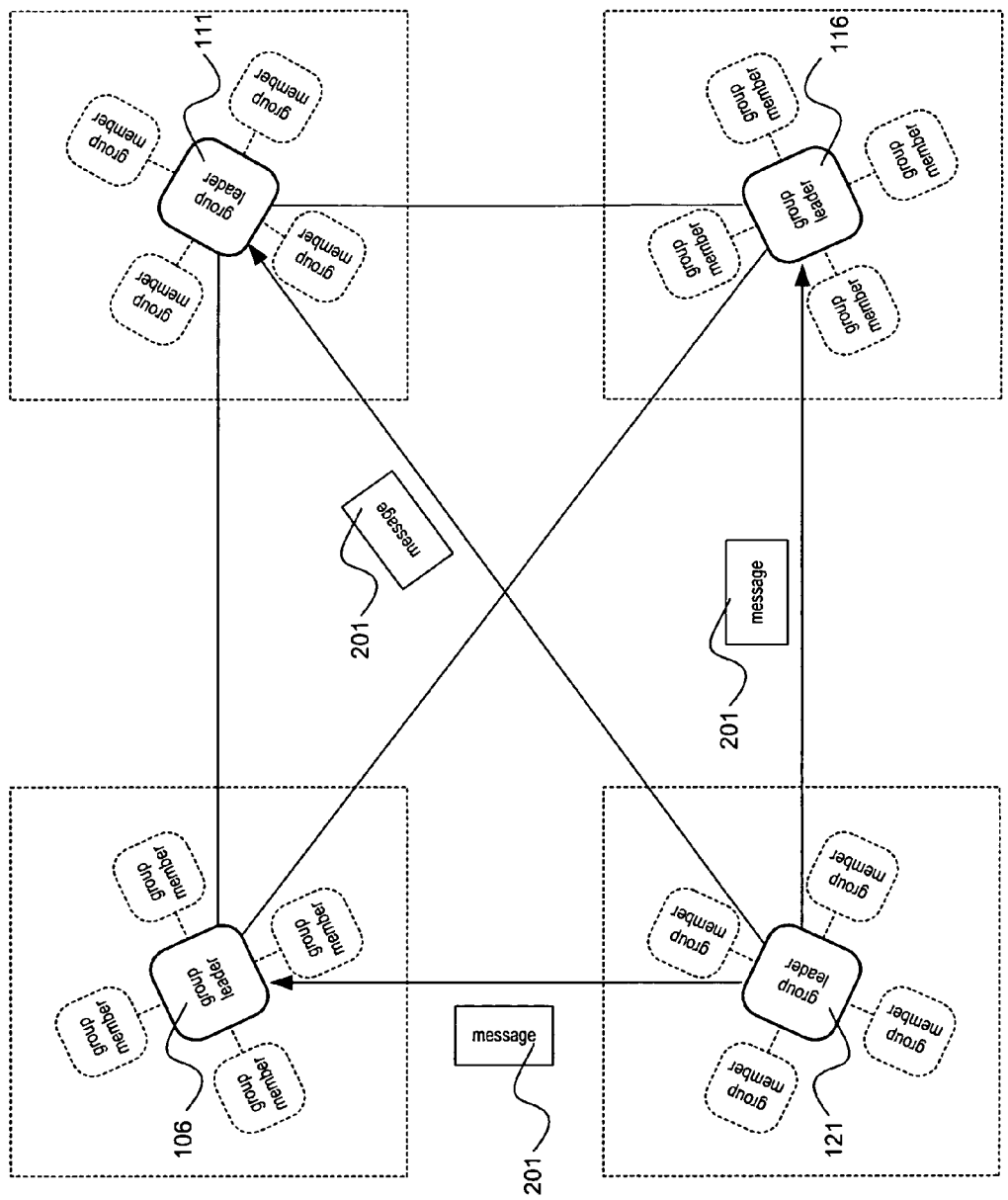
Figure 2D:
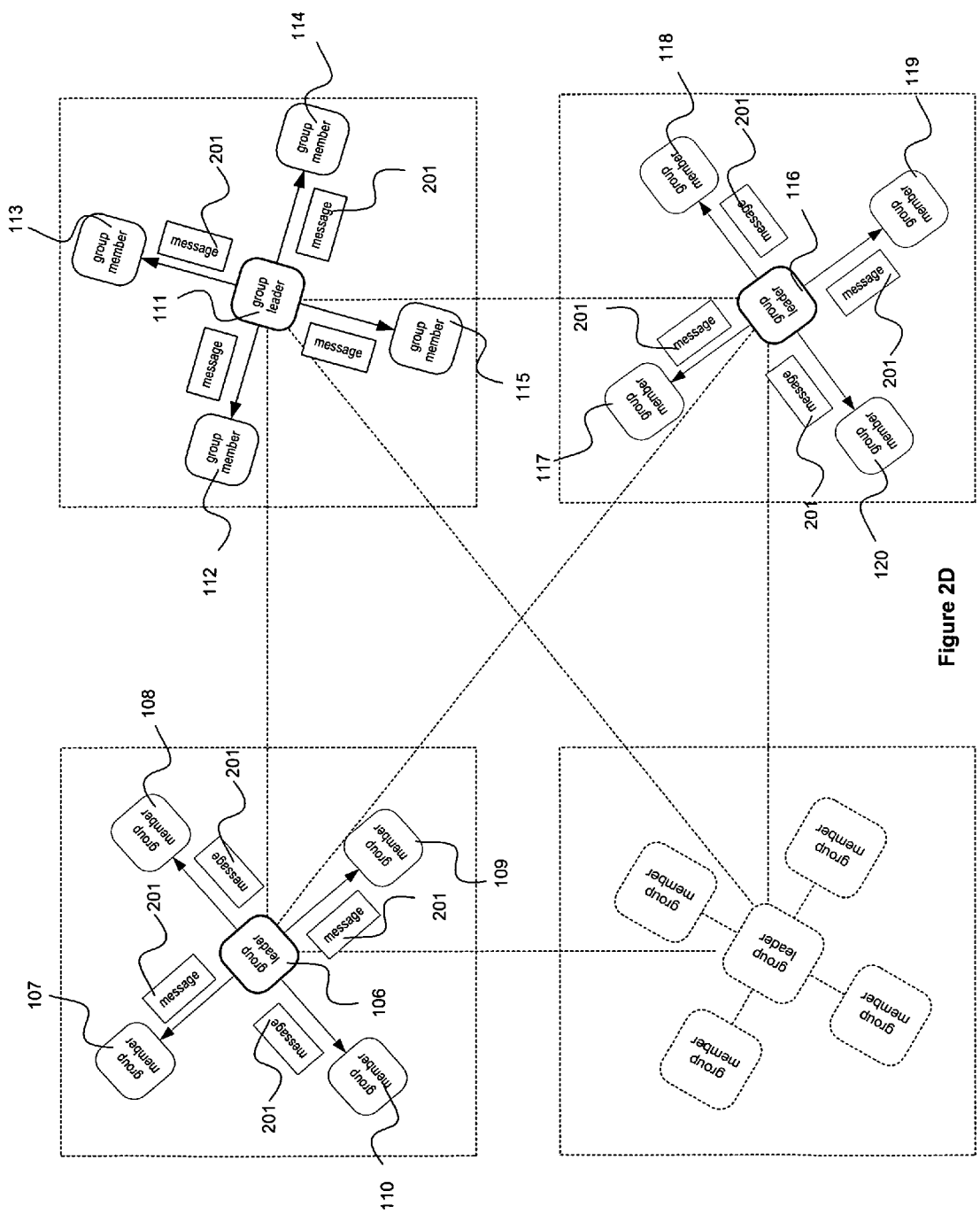
Figure 3:
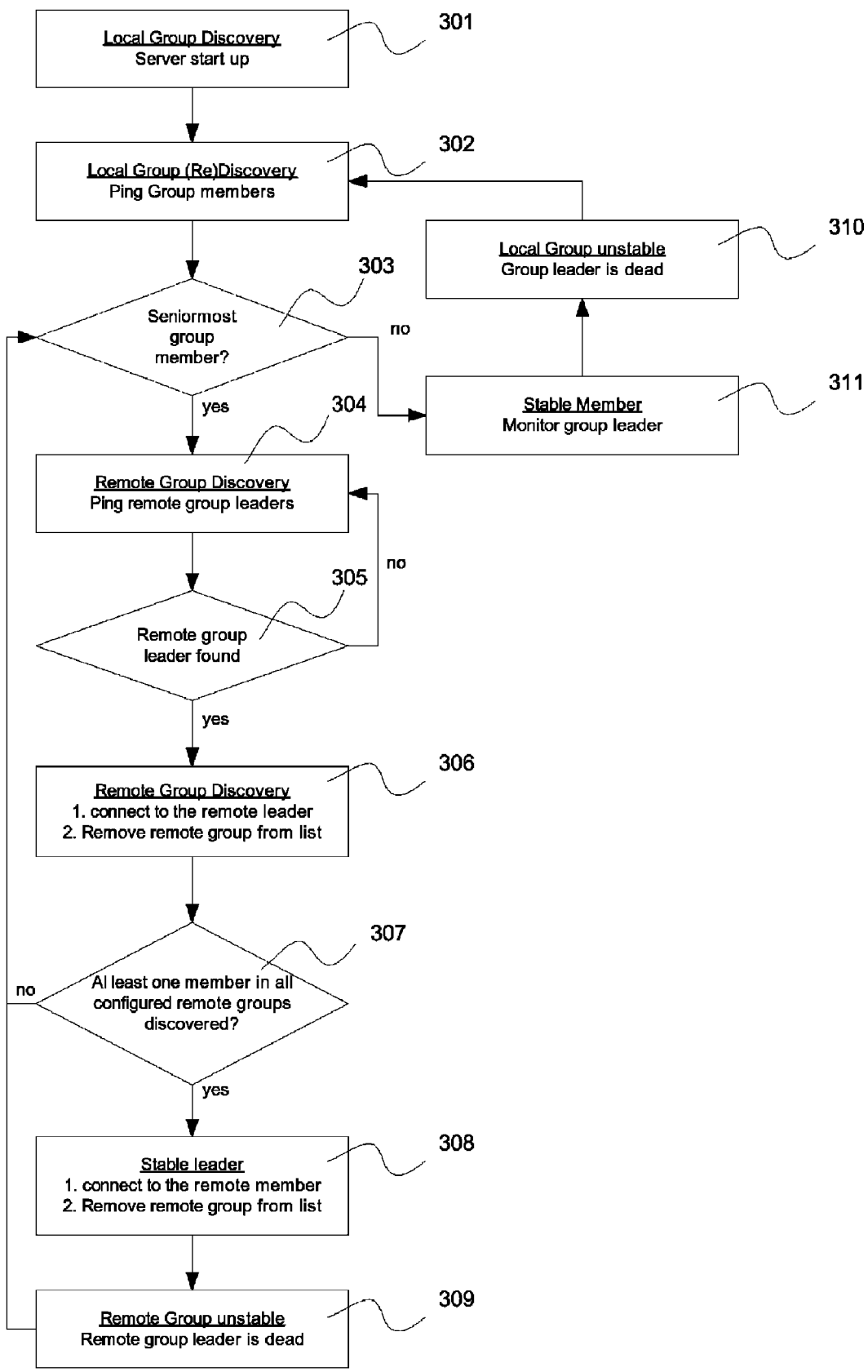
FIG. 3 is a flow chart illustrating a clustering messaging method and state transitions of a computer based application server node in an application server specific environment in accordance with one embodiment of the present invention.

One embodiment of present invention can be a method of communication in an application server cluster 101, which comprises: sending a message 201 from a group member application server node 124 to a group leader application server node 121 in an application server group 105 as shown in FIG. 2A; sending the message 201 from the group leader application server node 121 to remote group leader application server nodes 106, 111 and 116 as shown in FIG. 2C; sending the message 201 from the group leader application server node 121 to other group member application server nodes 122, 123, and 125 within the group 105 as shown in FIG. 2B, and sending the message from each remote group leader application server node 106, 111 and 116 to member application server nodes 107-110, 112-115, and 117-120 of the groups 102, 103 and 104 as shown in FIG. 2D.

One embodiment of present invention can be a clustering messaging method in application server specific environment 101, which comprises determining the application server node group leader, for example a group leader application server node 121; finding remote application server node group leaders 106, 111 and 116; and connecting to one remote application server node group member 119 through one remote application server node group leader 116.

In one embodiment of present invention, the clustering messaging method in application server specific environment 101 can further comprise the step of starting up an application server, for example 124.

In one embodiment of present invention, the clustering messaging method in application server specific environment 101 can further comprise the step of monitoring the application server node group leader, for example 121 for heartbeats.

In one embodiment of present invention, the clustering messaging method in application server specific environment 101 can further comprise the step of determining that one application server node group leader, for example 121 is dead if no heartbeat can be detected from the application server node group leader 121.

In one embodiment of present invention, the clustering messaging method in application server specific environment 101 can allow the group leader to be determined by pinging other group member application server nodes 123, 124 and 125 and finding the senior-most application server node group member, for example 123. The newly determined senior-most application server node group member 123 will become the new application server node group leader.

Embodiment of present invention can comprise application server instances acting as peers. The application server code can include code to allow the application server to act as a group leader and as a non-leader group member.

Figure 4:
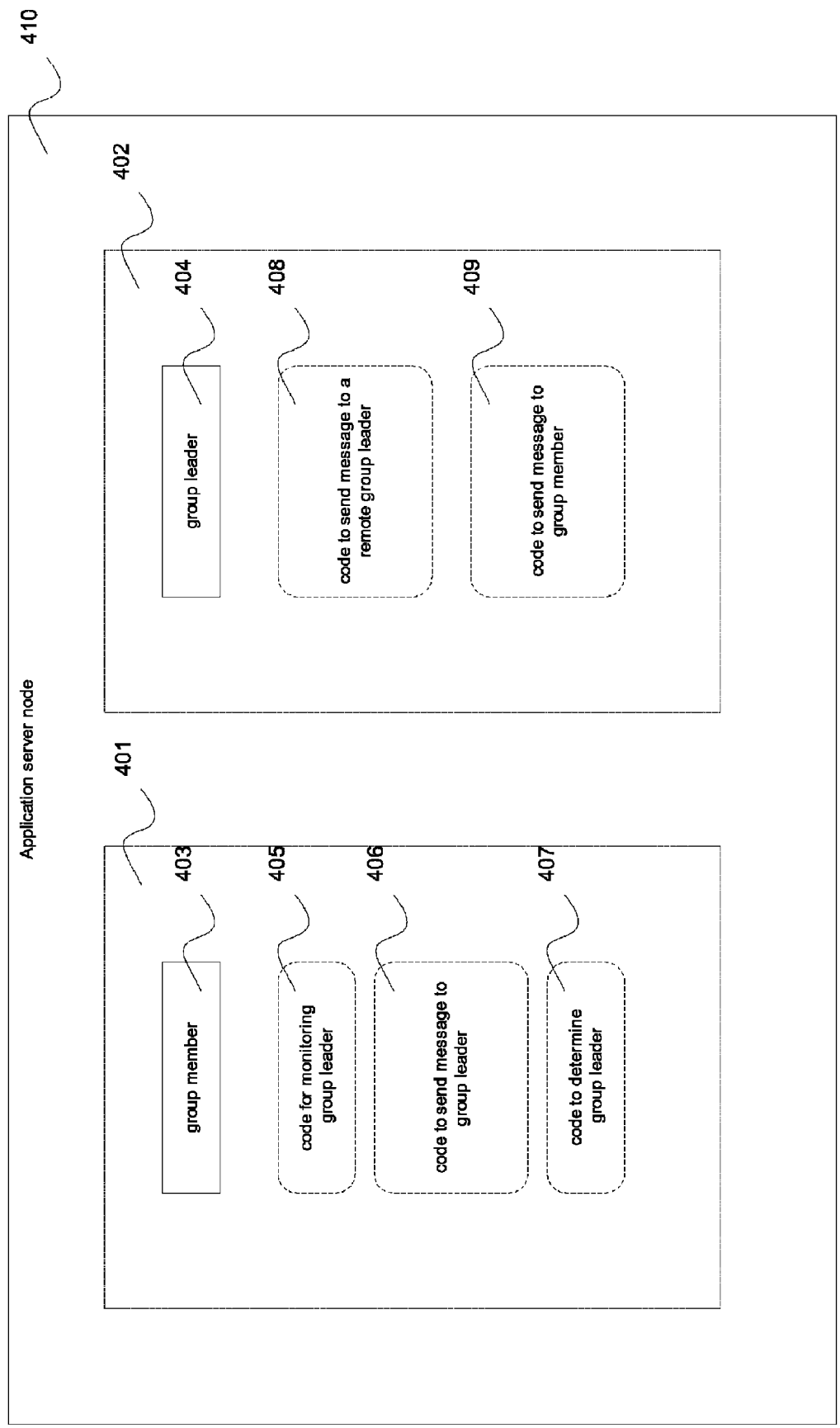
FIG. 4 is an exemplary illustration of a computer based application server node in accordance with one embodiment of the invention.

One embodiment of present invention is a computer based application server node 410 as shown in FIG. 4, which comprise code 401, if the application server node is a non-leader group member 403, to send messages meant for every application server node in a application server cluster to a group leader application server node 406; and code 402, if the application server node is a group leader 404, to forward messages meant for every application server node in the application server cluster to every group member application node within a group 409 and to other application server node group leaders 408.

Another embodiment of present invention is a computer based application server node 410 can further comprise code to determine with other group member application server nodes whether the application server node is a group leader or a non-leader group member 407.

Another embodiment of present invention is a computer based application server node 410 can further comprise code for monitoring the group application server node using heartbeat 405.

Figure 5:
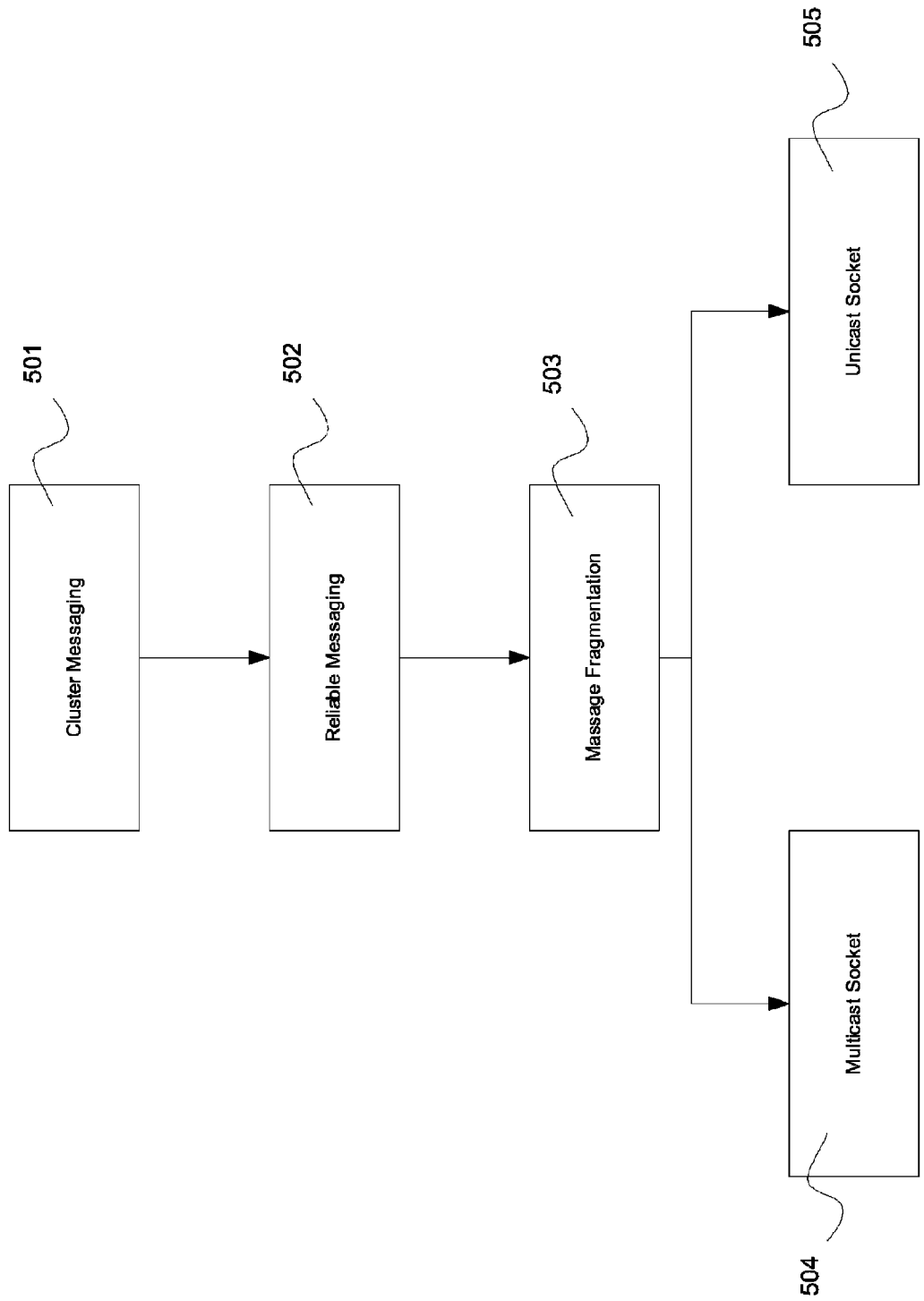
FIG. 5 is an illustration of the layered cluster messaging framework in an application server specific environment in accordance with one embodiment of the present invention.

In some embodiments of present invention, the cluster messaging framework is layered as shown in FIG. 5.

One embodiment of present invention supports a unicast-based cluster broadcast mechanism 505. This unicast mechanism 505 can be used in a system that either allows or does not allow multicast 504.

In one embodiment of present invention, an application server network system can invoke one embodiment of present invention based on either multicast 504 or unicast 505 depending on configuration settings. The switch between multicast 504 and unicast 505 can happen transparently, without the application server network system that depends on clustering seeing any impact.

One embodiment of present invention can use relevant cluster monitoring and debugging capabilities. A user interface and other administrative utilities can expose the option of multicast 504 or unicast 505 and can also switch monitoring attributes based on the messaging option. Either multicast 504 or unicast 505 can be set as default.

In one embodiment of present invention, the entire cluster uses a single form of messaging. In another embodiment of present invention, a hybrid cluster with some members using multicast and others using unicast can be supported.

In one embodiment of present invention, "N-way" socket connectivity between cluster members, as well as excessive chatter amongst cluster members, can be avoided.

One embodiment of present invention can ensure that messages will not be dropped because of unresponsive members in the cluster i.e. if server(s) responsible for message relay to downstream servers becomes unresponsive, a redundant path bypassing the unresponsive server(s) can be provided.

Another embodiment of present invention optimized the average number of hops needed for a broadcast message to reach all members of the cluster.

In one embodiment of present invention, members in the cluster can be broken down into groups based on static configuration like server names. During runtime, the server with the earliest startup time becomes the cluster leader of its respective group. Alternatively, some other selection method can be used. Group members can pass messages to each other using the leader as the hub. Message passing in a group can use the hub and spoke model.

In one embodiment of present invention, all group leaders can be inter-connected to each other directly to form an N-way connectivity mesh. This can provide reliability and reduce the number of messaging hops.

Group leaders can transmit received messages to all local group members and also to other group leaders. In one embodiment of present invention, each group can have a maximum of 10 members.

The group leaders can be critical for reliable message delivery. In one embodiment of present invention, all group members can monitor the leader using heartbeats to make sure that the leader is alive and healthy. Missing heartbeats from the leader can cause the next seniormost member of the group to assume leadership role. One embodiment of present invention can have two leaders in the group since duplicate messages can be handled by the cluster. In one embodiment of present invention, group leaders are not singleton services.

In some embodiments of present invention, there is no guarantee that all members can receive the message in the first attempt. Re-transmission and sequence numbers can be used to make sure that the message eventually reaches all participants in the ring.

In some embodiments of present invention, member can, by default, be connected to each other using the default network channel. Administrators can also possible to configure a custom network channel for unicast messaging. The network channel can be configured at the cluster level.

In one embodiment of present invention, each cluster member can monitor the local group leader through the use of connection heartbests and disconnect events. Unresponsive group leaders can be bypassed to form links with remote groups. In some embodiment of present invention, all cluster members can periodically send cluster heartbeats announcing the most recent message number. Cluster members who do not have the most recent message can request for re-transmission in order to catch up.

In some embodiment of present invention, security can be provided by the use of custom network channel for Unicasting messaging. The custom network channel can have SSL turned on providing secure transport. All cluster group messages can be encrypted using different encryption scheme.

The unicast messages can appear like normal system message. In one embodiment of present invention that uses the Weblogic T3 protocol, the wire level messages can appear like T3 messages to network monitors with specially encoding to differentiate from other types of T3 requests. The T3 dispatcher on the receiving side can understand the special nature of the unicast requests and dispatch them to a special handler without going through the connection management layer. The socket connection established for unicast messaging need not be shared by other T3 clients and can be maintained exclusively for unicast messaging. This can enable closing and re-opening connections without worrying about ripple effects on other T3 users.

In one embodiment of present invention, unicast implementation is not depending on Remote Method Invocation (RMI) or Hyper Text Transfer Protocol (HTTP) containers being available either on the sending or receiving side.

In one embodiment of present invention, an user interface or other administrative tools can expose one, any combination or all of the following configuration attributes:
1. cluster messaging mode—default value can be 'unicast' with possible values can be 'unicast' and 'multicast';
2. remote group discovered count;
3. local group leader name;
4. total number of group in the cluster;
5. group composition—i.e. server names in each group;
6. group leader for each group as seen by individual servers;
7. servers running in each group;
8. cluster state; and
9. all other existing cluster runtime attributes.

In one embodiment of present invention, cluster state for each application server node in the cluster can be one of the following:
1. Local Group Discovery 301 and 302—servers trying to identify the local group leader;
2. Stable member 311—server is not the seniormost running member;
3. Remote Group Discovery 304 and 306—server is group leader and is attempting connections to remote groups;
4. Stable Leader 308—server is group leader and has connectivity to all remote groups;
5. Local group unstable 310—the seniormost member is dead while local group is reforming;
6. Remote Group unstable 309—group leader lost connectivity to at least one remote group.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system for clustering messaging in application server environment, comprising:
    a plurality of application server groups with a plurality of group leader application server nodes, wherein the plurality of group leader application server nodes in the plurality of application server groups are inter-connected with each other directly,
    wherein each application server group includes at least one said group leader application server node and one or more group member application server nodes,
    wherein, within each application server group, each said group member application server node connects directly with the at least one group leader application server node for that particular application server group, and
    wherein a message can be sent from a first group member application server node in a first application server group to other group member application server nodes in the other application server groups, based on a unicasting messaging mechanism, via the following steps:
        sending, via the unicasting messaging mechanism, the message from the first group member application server node to a first group leader application server node in the first application server group,
        sending, via the unicasting messaging mechanism, the message from the first group leader application server node in the first application server group to each other group leader application server node in the other application server groups,
        sending, via the unicasting messaging mechanism, the message from the each other group leader application server node to the other group member application server nodes in the other application server groups, and
    retransmitting, via another group leader application server node, the message to make sure the message eventually reach all participants, wherein, if an application server node responsible for relaying the messages to a downstream application server node becomes unresponsive, the message is transmitted using a redundant path bypassing the unresponsive application server node.

2. The system according to claim 1, wherein:
    within each application server group, each group member application server node monitors the group leader application server node of the particular application server group using heartbeat.

3. The system according to claim 2, wherein:
    one group member application server node within an application server node group replaces the group leader application server node of the particular application server group as a new group leader application server node, if no heartbeat is detected from the group leader application server node.

4. The system according to claim 3, wherein:
    the new group leader application server node is determined by finding a senior-most group member application server node in the application server group.

5. The system according to claim 1, wherein:
    the group leader application server node is capable of retransmitting messages to make sure that the messages eventually reach all participants.

6. The system according to claim 1, wherein:
    the message is sent using TCP/IP protocol.

7. The system according to claim 1, wherein:
    each application server group has a fixed maximum size of not more than 20 group members.

8. The system according to claim 1, further comprising:
    a super node that is associated with each group leader application server node in the plurality of application server groups.

9. The system according to claim 1, wherein:
    an application server group is a hybrid cluster with some group member application server nodes using multicasting messaging protocol and other group member application server nodes using unicasting messaging protocol.

10. A method of communication in an application server cluster, comprising:
    providing a plurality of application server groups with a plurality of group leader application server nodes, wherein the plurality of group leader application server nodes in the plurality of application server groups are inter-connected with each other directly, wherein each application server group includes at least one said group leader application server node and one or more group member application server nodes, wherein, within each application server group, each said group member application server node connects directly with the at least one group leader application server node for that particular application server group;
    allowing, via a unicasting messaging mechanism, a message to be sent from a first group member application server node to a first group leader application server node in a first application server group;
    allowing, via the unicasting messaging mechanism, the message to be sent from the first group leader application server node to each other group leader application server node in the other application server groups;
    allowing, via the unicasting messaging mechanism, the message to be sent from each other group leader application server node to the other group member application server nodes in the other application server groups, and retransmitting, via another group leader application server node, the message to make sure the message eventually reach all participants, wherein, if an application server node responsible for relaying the messages to a downstream application server node becomes unresponsive, the message is transmitted using a redundant path bypassing the unresponsive application server node.

11. The method according to claim 10, further comprising: monitoring a group leader application server node in an application server group by group member application server nodes in the application server group using heartbeats.

12. The method according to claim 11, further comprising: replacing a group leader application server node of an application server group if no heartbeat is detected from the group leader application server node.

13. The method according to claim 10, further comprising: allowing each application server group to have a fixed maximum size of not more than 20 group members.

14. The method according to claim 10, further comprising: associating each group leader application server node with a super node.

15. A non-transitory machine readable medium having instructions stored thereon that when executed by a processor cause a system to:

provide a plurality of application server groups with a plurality of group leader application server nodes, wherein the plurality of group leader application server nodes in the plurality of application server groups are inter-connected with each other directly, wherein each application server group includes at least one said group leader application server node and one or more group member application server nodes, wherein, within each application server group, each said group member application server node connects directly with the at least one group leader application server node for that particular application server group;

allow, via a unicasting messaging mechanism, a message to be sent from a first group member application server node to a first group leader application server node in a first application server group;

allow, via the unicasting messaging mechanism, the message to be sent from the first group leader application server node to each other group leader application server node in the other application server groups;

allow, via the unicasting messaging mechanism, the message to be sent from the each other group leader application server node to the other group member application server nodes in the other application server groups, and retransmit, via another group leader application server node, the message to make sure the message eventually reach all participants, wherein, if an application server node responsible for relaying the messages to a downstream application server node becomes unresponsive, the message is transmitted using a redundant path bypassing the unresponsive application server node.

* * * * *

UNITED STATES PATENT AND TRADEMARK OFFICE
CERTIFICATE OF CORRECTION

| | | |
|---|---|---|
| PATENT NO. | : 7,904,551 B2 | Page 1 of 1 |
| APPLICATION NO. | : 12/056708 | |
| DATED | : March 8, 2011 | |
| INVENTOR(S) | : Revanuru | |

It is certified that error appears in the above-identified patent and that said Letters Patent is hereby corrected as shown below:

On sheet 8 of 8, in figure 5, Box No. 503, line 1, delete "Massage" and insert -- Message --, therefor.

In column 1, line 66, delete "FIG." and insert -- FIGS. --, therefor.

In column 5, line 33, delete "heartbests" and insert -- heartbeats --, therefor.

Signed and Sealed this
Fourth Day of October, 2011

David J. Kappos
*Director of the United States Patent and Trademark Office*